(12) United States Patent
McMasters et al.

(10) Patent No.: US 8,406,931 B2
(45) Date of Patent: Mar. 26, 2013

(54) A/C SERVICE TOOL CONTROLLER

(75) Inventors: Mark McMasters, Owatonna, MN (US); Michael Schoenoff, Rochester, MN (US); William Brown, Owatonna, MN (US)

(73) Assignee: Service Solutions U.S. LLC, Warren, MI (US)

( * ) Notice: Subject to any disclaimer, the term of this patent is extended or adjusted under 35 U.S.C. 154(b) by 387 days.

(21) Appl. No.: 12/651,045

(22) Filed: Dec. 31, 2009

(65) Prior Publication Data

US 2011/0160918 A1 Jun. 30, 2011

(51) Int. Cl.
*G06F 19/00* (2011.01)
(52) U.S. Cl. ........................................ 700/282; 700/286
(58) Field of Classification Search .................. 700/282, 700/276, 83, 66, 26, 19, 17, 9; 236/51
See application file for complete search history.

(56) References Cited

U.S. PATENT DOCUMENTS

| | | | | |
|---|---|---|---|---|
| 4,600,993 A * | 7/1986 | Pauwels et al. | ............... | 701/103 |
| 5,555,509 A * | 9/1996 | Dolan et al. | ................... | 700/276 |
| 5,682,329 A * | 10/1997 | Seem et al. | .................... | 700/276 |
| 5,892,690 A * | 4/1999 | Boatman et al. | ............... | 700/276 |
| 5,987,996 A * | 11/1999 | Kim et al. | ........................ | 73/756 |
| 6,005,375 A * | 12/1999 | van Saders et al. | ........... | 323/273 |
| 7,162,884 B2 * | 1/2007 | Alles | ............................... | 62/178 |
| 7,383,158 B2 * | 6/2008 | Krocker et al. | ............... | 702/186 |
| 7,451,606 B2 * | 11/2008 | Harrod | .............................. | 62/77 |
| 2003/0060933 A1* | 3/2003 | Sulfstede | ...................... | 700/276 |
| 2003/0195640 A1* | 10/2003 | Krocker et al. | ................. | 700/26 |
| 2004/0182095 A1* | 9/2004 | Alles | ............................... | 62/178 |
| 2005/0159847 A1* | 7/2005 | Shah et al. | .................... | 700/276 |

* cited by examiner

*Primary Examiner* — Kidest Bahta
(74) *Attorney, Agent, or Firm* — Baker & Hostetler LLP (57) ABSTRACT

An apparatus for automated control of A/C service tools for use during A/C servicing tasks. The apparatus including hardware and software to run the automation programs, connectors to connect with the service tools to allow passage of vapors and liquids between the service tools and the A/C system, and power ports to plug the service tools into the apparatus so that it may control the power to the service tools. Further, the apparatus may include sensors and valves so that it might sense pressure within a system of connected service tools and the A/C system, and so that it might be able to control the flow of vapors and liquids between components of the system based on the automation programs and the readings from the sensors.

21 Claims, 10 Drawing Sheets

A/C SERVICE TOOL CONTROLLER

FIELD OF THE INVENTION

The present invention relates generally to the automated control of A/C, or HVAC, service tools for servicing A/C, or HVAC, systems. More particularly, the present invention relates to the automating control of one or more A/C, or HVAC, service tools by connecting the service tools to a device that may control the power supply to the service tools and the flow of refrigerant between the A/C, or HVAC, system and the service tools.

BACKGROUND OF THE INVENTION

A/C systems typically require routine maintenance and servicing to maintain designed levels of efficiency and effectiveness. Such maintenance and servicing may also have an affect on the longevity of the A/C systems, being that keeping an A/C system in better condition may allow the system to remain useful for a longer period than without maintenance and servicing.

To perform maintenance and service on A/C systems, technicians generally employ specialty equipment suited for specific tasks. Depending on the tasks the technician needs to perform, he may have to employ more than one A/C system service tool. Such tools may include one or more of a recovery machine, a refrigerant scale, a vacuum pump, a refrigerant recovery tank, etc. Commonly, a technician may use a manifold gauge set to couple an A/C system service tool with the A/C system, and to monitor and regulate the refrigerant flow to and from the A/C system. Manifold gauge sets are manually controlled and monitored by the technician.

Depending on the maintenance and service to be performed on and A/C system, and other factors, like the size, age, and model of the A/C system, time to complete the tasks may be lengthy and require significant attention from the technician. Lengthy and/or attention intensive tasks may slow the overall completion of the tasks involved in the maintenance and service of the A/C system. Further, there maybe be significant lag time between tasks if the technician is required to set up different equipment for some of the tasks, including time to disconnect the previously used equipment and connect the needed equipment, and making manual adjustments to the settings on the manifold gauge set.

It is desirable to provide a method and apparatus, for example, an A/C service tool controller for automating control of one or more A/C service tools by connecting the service tools to the apparatus, which may control the power supply to the service tools and the flow of refrigerant between the A/C system and the service tools.

SUMMARY OF THE INVENTION

At least in view of the above, it would be desirable to provide a method and apparatus, for example, an A/C service tool controller for automating control of one or more A/C service tools by connecting the service tools to the apparatus, which may control the power supply to the service tools and the flow of refrigerant between the A/C system and the service tools.

The foregoing needs are met, to a great extent, by certain embodiments of the present invention. In accordance with one embodiment of the present invention, an A/C service tool controller for connecting to an A/C system and A/C service tools via connecting conduits and controlling A/C service tasks involving the A/C system and A/C service tools is provided, that can include a memory configured to store instructions for running the A/C service tool controller, a processor communicatively connected to the memory and configured to access and execute the instructions, a manifold having a plurality of connectors configured to attach to connecting conduits leading to the A/C system and A/C service tools, a valve configured to control the flow of substances though the manifold, a pressure sensor communicatively connected to the processor and configured to sense a pressure within the manifold, a power port communicatively connected to the processor and configured to accept a power plug of the A/C service tool, and a display communicatively connected to the processor configured to display information.

In accordance with another embodiment of the present invention, a method of automatically controlling A/C service tasks involving A/C service tools and an A/C system via an A/C service tool controller is provided and can include controlling power to a power port of the A/C service tool controller for powering the A/C service tool, sensing a pressure in the A/C service tool controller, adjusting valves in the A/C service tool controller, and displaying the pressure sensing readings on a display.

In accordance with yet another embodiment of the present invention, a system for connecting to an A/C system and A/C service tools via connecting conduits and controlling A/C service tasks involving the A/C system and A/C service tools is provided and can include a storing means for storing instructions for running the system, a processing means for accessing and executing the instructions, and communicatively connected to the storing means, a transmission means having a plurality of connectors configured to attach to connecting conduits leading to the A/C system and A/C service tools, a valve means configured to control a flow of substances though the transmission means, a pressure sensing means communicatively connected to the processing means and configured to sense a pressure within the transmission means, a powering means for accepting a power plug of the A/C service tool and communicatively connected to the processing means, and a display means for displaying pressure readings and communicatively connected to the processing means.

In accordance with still another embodiment of the present invention, an A/C service tool controller for connecting to an A/C system and A/C service tools via connecting conduits and controlling A/C service tasks involving the A/C system and A/C service tools is provided, that can include an electrical socket configured to provide power to the A/C service tool; a relay configured to control a current to the electrical socket; a manifold having a plurality of connectors configured to attach to connecting conduits leading to the A/C system and A/C service tools; a solenoid configured to control a flow of substances though the manifold, and a sensor configured to sense a pressure within the manifold; and a display configured to indicated readings from the sensor.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and apparatus includes an A/C service tool controller for automating control of one or more A/C, or HVAC, service tools ("A/C service tool controller"). The A/C service tool controller may automate the control of one or more A/C service tools by being connected to the service tools and to an A/C, or HVAC, system. The control functionality of the A/C service tool controller may include controlling the power supply to the service tools and the flow of refrigerant between the A/C system and the service tools. The A/C service tool controller may couple one or more service tools with an A/C system. Control for one or more service tools may be configured prior to individual tasks of the maintenance and service conducted for the A/C system, or the control could be wholly or partially configured prior to executing any tasks of the maintenance and service.

The A/C service tool controller may control refrigerant flow in and out of the A/C system being serviced, and to and from the various service tools. Also, the A/C service tool controller may be able to control the electrical function of the associated service tools. A user may plug in commonly used service equipment into the A/C service tool controller, such as recovery machines, vacuum pumps, scales, etc. and the A/C service tool controller may control the function and timing of the operation of these service tools without requiring constant monitoring by the user. The A/C service tool controller may include a universal adapter or may be equipped with adaptors for the various service tools. The A/C service tool controller may supply power to the service tools, switch them on and off at the appropriate times, monitor and display pressures and vacuums, and optimize refrigerant recovery by automatically configuring the recovery into a push/pull mode when available, among other functions. The A/C service tool controller may be scalable, modular, and expandable.

During a recovery, especially on large systems, the time to recover refrigerant and evacuate the A/C system with a vacuum pump can be a lengthy process requiring constant monitoring. When recovering large amounts of refrigerant from A/C systems, recovery tank changeovers may be required due to the capacity of the recovery tanks. The A/C service tool controller may start the recovery, monitor the recovery, switch tanks as required, and then begin to pull the system down into a vacuum automatically without the need to manually perform these operations. Additionally, the A/C service tool controller could monitor pressure in each of the tanks, continue to monitor which tank has the lowest pressure, and automatically switch to recover into that tank in order to speed the recovery process. The A/C service tool controller could even perform a leak check on the system. Since the user does not have to monitor and maintain the process, the user is free to work on other tasks which will speed up the job.

Figure 1:
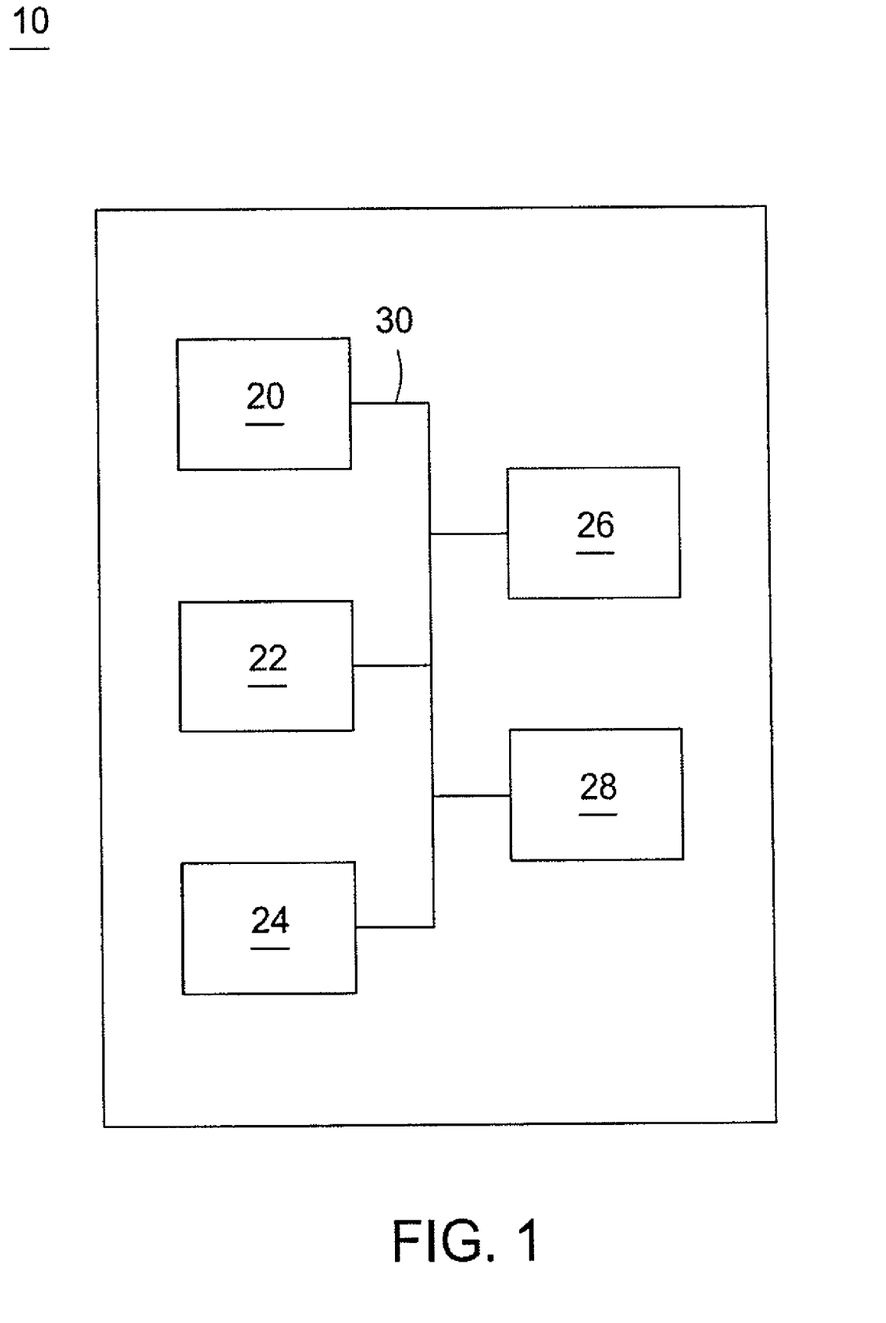
FIG. 1 is a block diagram of major components of an A/C service tool controller according to an embodiment of the invention.

The invention will now be described with reference to the drawing figures, in which like reference numerals refer to like parts throughout. FIG. 1 is a block diagram illustrating major components of the A/C service tool controller 10 according to an embodiment of the present invention.

The A/C service tool controller 10 may include a processor 20, a memory 22, a connector 24, an input device 26, and a display 28. The electronic components of the A/C service tool controller 10 may be interconnected by a datalink 30.

The A/C service tool controller 10 may be preprogrammed for use with any existing or newly developed A/C service tools or A/C systems. The programming may include generic algorithms that allow the A/C service tool controller 10 to be compatible with any brand or type of A/C service tool. Such generic programming may be accomplished through algorithms that generally do not need to communicatively interface with the service tools, such that all the control features occur at the A/C service tool controller 10. For example, the A/C service tool controller 10 may regulate pressure through the use of valves integrated into the A/C service tool controller 10 itself, and it may also control the flow of power to the service tools through components of the A/C service tool controller 10. Such power control components may include, for example, various types of electrical switches. Further, the algorithms may be constructed such that a user, such as an A/C technician, may enter parameters to effect the behavior of the A/C service tool controller 10 to match the requirements for use with whatever service tools are used and A/C system is being serviced.

Conversely, the A/C service tool controller 10 may be programmed for use with specific A/C service tools and/or A/C systems. The algorithms of the A/C service tool controller 10 may be constructed to function in a way specific to a certain type or brand of A/C service tool or A/C system.

The A/C service tool controller 10 may include the processor 20 to implement the control algorithms and accept entered parameters which may affect how the control algorithms are effected. The processor 20 may implement control algorithms that may control, for example, the power supplied to the A/C service tools, the pressure in connecting conduits that may allow for the transfer of refrigerant and/or air between the service tools and the A/C system, the time for which and/or order in which the A/C service tools are run. The processor 20 may also monitor sensors (not shown) of the A/C service tool controller 10 to monitor the pressure in the connecting conduits to manage the pressure and to determine if there conduits are properly connected to the A/C service tool controller 10, the A/C service tools, and the A/C system.

Different types of processors 20 may be suitable for use in the A/C service tool controller 10. Thus, the processor 20 of the A/C service tool controller 10 may be, for example, an FPGA, a CLPD, a PLA, a microprocessor, or a combination thereof. Different complexities in the programming may affect the choice of type or combination of the above to comprise the processor 20.

The memory 22 may be included in the A/C service tool controller 10. The memory 22 of the A/C service tool controller 10 may serve a couple purposes. Firstly, this memory 22 may store instructions or algorithms necessary to execute the control of the A/C service tools. The memory 22 may also be used to store settings made by an A/C system technician. For example, the memory 22 may store the technicians settings for reference during an immediate service situation or for future service applications. The A/C system technician may program settings pertinent for certain A/C systems for the different A/C service tools used with the A/C system. Those setting may be employed in a service application at the time the technician is making the program settings, or they maybe saved for future and/or repeated selection and use.

Similar to the choice of the processor 20, the configuration of the software of the A/C service tool controller 10 may affect the choice of memory 22 used in the A/C service tool controller 10. Other factors may also affect the choice of memory 22 type for use in the A/C service tool controller 10, such as price, speed, durability, and reprogrammability. Thus, the memory 22 of the A/C service tool controller 10 may be, for example, optical, magnetic, solid state, read only, or rewritable. The memory 22 may also be removable, such as, for example, a CD or DVD, which may be inserted into and removed from a CD and/or DVD reader/writer (not shown). The CD and/or DVD reader/writer may be integral or peripherally connected to the A/C service tool controller 10.

The A/C service tool controller 10 may further include one or more of a variety of connectors 24. The connectors 24 of the A/C service tool may effect a number of different types of connections with a variety of devices. Some such connectors 24 may be used, for example, to connect the connecting conduits for air and/or refrigerant, to connect a conduit to facilitate the provision of power to the A/C service tools, or to connect the service tools to the A/C service tool controller 10 to transfer information between devices. The A/C service tool controller may include a universal adapter for the different connections or may be equipped with adaptors for the various service tools for the different connections.

The configuration of the A/C service tool controller 10 may also dictate the type(s) of connector(s) 24 employed. In some instances the A/C service tool controller 10 may be constructed for use with certain types or brands of A/C service tools or A/C systems, and the connectors 24 may be proprietary. These connectors 24 may include, for example, proprietary data ports, proprietary power ports, and proprietary ports for coupling with the connecting conduits. The proprietary connectors may be "swapped" out for other proprietary connectors depending on the brands and types of A/C service tools or A/C system coupled with the A/C service tool controller.

Other embodiments of the A/C service tool controller 10 may be universally useable with a multitude of different A/C service tool or A/C system types or brands. In such an instance the connectors 24 may be, for example, standard data ports, power ports, and ports for coupling with the connecting conduits. Some such data ports may include, for example, a serial port, a parallel port, or both. The connector 24 may include on or more of USB (Universal Serial Bus), Micro-USB, FireWire, Ethernet, or any connector capable of connecting electronic components. Another type of connector 24 may be any connector able to connect electrical components, such as one that might typically be employed in the overfill protection mechanism of a refrigerant tank. To be able to provide power, the A/C service tool controller may do so via the connector 24, whether it be a data port or an electrical outlet suitable to receive an electrical plug from an A/C service tool. The connector 24 may also allow connection of a connecting conduit via, for example, a threaded, latching, clipping, or other form of locking mechanism.

The connector(s) 24, when of the type for connecting to a connecting conduit, may be part of a manifold having an inlet(s) and outlet(s) for allowing the passage of air or refrigerant between the A/C service tools and the A/C system through the A/C service tool controller 10. The connector 24 can be at each of the inlet(s) and the outlet(s) for connecting the connecting conduit to the manifold. The A/C service tool controller 10 may employ pressure sensing components, for example, pressure sensors or pressure switches, to monitor the pressure of the air or refrigerant within a system created when the A/C service tool controller 10 is connected to A/C service tools and an A/C system. Similarly, the A/C service tool controller 10 may employ temperature sensing components, for example, temperature sensors or thermometers, to monitor the temperature of the air or refrigerant within the system created when the A/C service tool controller 10 is connected to A/C service tools and an A/C system.

As previously mentioned, these pressure sensing components may be coupled to the processor, and used to monitor and modify the pressure. The pressure modification may by accomplished by the A/C service tool controller 10 moderating the power provided to the service tools, or the manifold may further include valves that may be adjusted to allow or impede the flow of air or refrigerant through the manifold. The valves may be adjustable manually, in which case the A/C service tool controller may visually or audibly notify the user of the detected pressure, and the user may manually adjust the valves accordingly. Electronically controlled valves, such as solenoid valves, may be used when the A/C service tool controller may automatically adjust the valves according to the sensed pressure.

In various embodiments, the A/C service tool controller 10 may be coupled to a communication network (not shown) via the connector 24. The communication network allows for communication between the A/C service tool controller 10 and the A/C service tools, the A/C system, and other computing devices. In various embodiments, the connector 24 may incorporate any combination of devices—as well as any associated software or firmware—configured to couple processor-based systems. Such communication devices may include modems, network interface cards, serial buses, parallel buses, LAN or WAN interfaces, wired, wireless or optical interfaces, and the like, along with any associated transmission protocols, as may be desired or required by the design. Various embodiments of the communication network may include any viable combination of devices and systems capable of linking computer-based systems, such as USB; Bluetooth; Wi-Fi; the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

Additionally, an embodiment of the A/C service tool controller 10 can communicate information to the user through the display 28, for example a monochromatic or color LCD screen, and request user input through the input device 26 by way of an interactive, menu-driven, visual display-based user interface, or graphical user interface (GUI). The A/C service tool controller 10 may respond to these user inputs by executing the control algorithms for the A/C service tools and modifying their operation.

Other embodiments envisioned may also simply employ an analogue or digital pressure gauge as the display 28. In some instances the display 28 may be a cluster of more than one pressure gauge. Further still, the display 28 may simply be one or more indicators, such as, for example, LEDs used to alert the user in a general manner of an issue, or which may indicate specific alerts to the user. Other indicators, for example, audible indicators, may be used instead, or in conjunction with the visual indicators and/or display 28 previously mentioned.

A further feature of the A/C service tool controller 10 may include having an input device 26 which may include, for example, a selection means and/or a typing means. The input device 26 may be used by the A/C system technician to, for example, select, run, and enter parameters for the control algorithms used by the A/C service tool controller, potentially through the GUI.

The input device 26 may include, for example, a pointing device, such as a mouse or a stylus, keys, buttons, a trackball, a scroll wheel, a touch sensitive pad, a touch screen, or a voice-activated system to select from a variety of selectable fields, including selectable menus, drop-down menus, tabs, buttons, bullets, checkboxes, text boxes, and the like. Other traditional input devices 26, such as a keyboard may also be employed to enter information.

The A/C service tool controller 10 may be, in part, a general computer, such as a personal computer (PC), a UNIX workstation, a server, a mainframe computer, a personal digital assistant (PDA), a cellular phone, a smart phone, or some combination of these. Alternatively, the A/C service tool controller 10 may be a specialized computing device. The remaining components can include programming code, such as source code, object code or executable code, stored on a computer-readable medium that can be loaded into the memory and processed by the processor 20 in order to perform desired functions.

Figure 2:
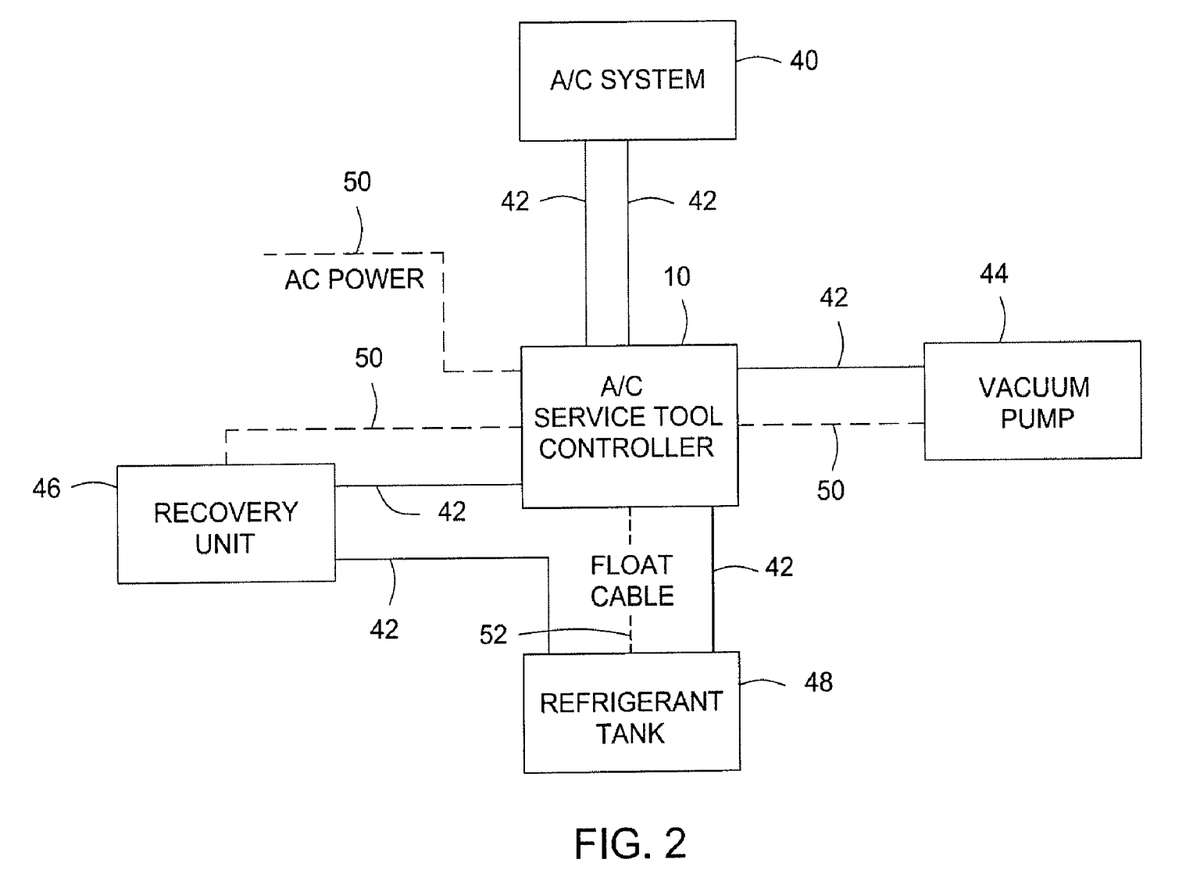
FIG. 2 is a block diagram an A/C service tool controller connected to an A/C system and A/C service tools according to an embodiment of the invention.

Referring now to FIG. 2, illustrated is a block diagram of the A/C service tool controller 10 connected to a selection of A/C service tools and an A/C system 40 according to one embodiment of the invention. As shown, the A/C system 40 may be connected to the A/C service tool controller 10 via one or more connecting conduits 42. The A/C service tool controller 10 may also be connected to a number of service tools, for example, a vacuum pump 44, a recovery unit 46, and a refrigerant tank 48, via respective connecting conduits 42.

Further, the A/C service tool controller 10 may be connected to a power source (not shown) via a power cable 50. Each of the service tools requiring power may then be connected to the A/C service tool controller 10 via respective power cables 50. In other embodiments, the power cable 50 and the connecting conduit 42 may be in one cable. The illustration further includes a depiction of a float cable 52 which connects the overflow prevention mechanism (not shown) of the refrigerant tank 48 to the A/C service tool controller 10. When the recovery tank 48 is filled, the overflow prevention mechanism is triggered and an electric signal is generated and transmitted to the connector 24 of the A/C service tool controller 10 to which the float cable 52 is connected. After receiving the signal, the A/C service tool controller 10 may cutoff power to the appropriate service tools to prevent overfilling the refrigerant tank 48.

With the setup depicted in FIG. 2, the recovery unit 46 may be connected directly to the refrigerant tank 48 via the connecting conduit 42, because the A/C service tool controller 10 may control when to stop the service tools by the signal it receives from the refrigerant tank 48. However, the A/C service tool 10 may accommodate more than one refrigerant tank 48, and may employ a different method for managing the filling of the refrigerant tanks 48.

Figure 3:
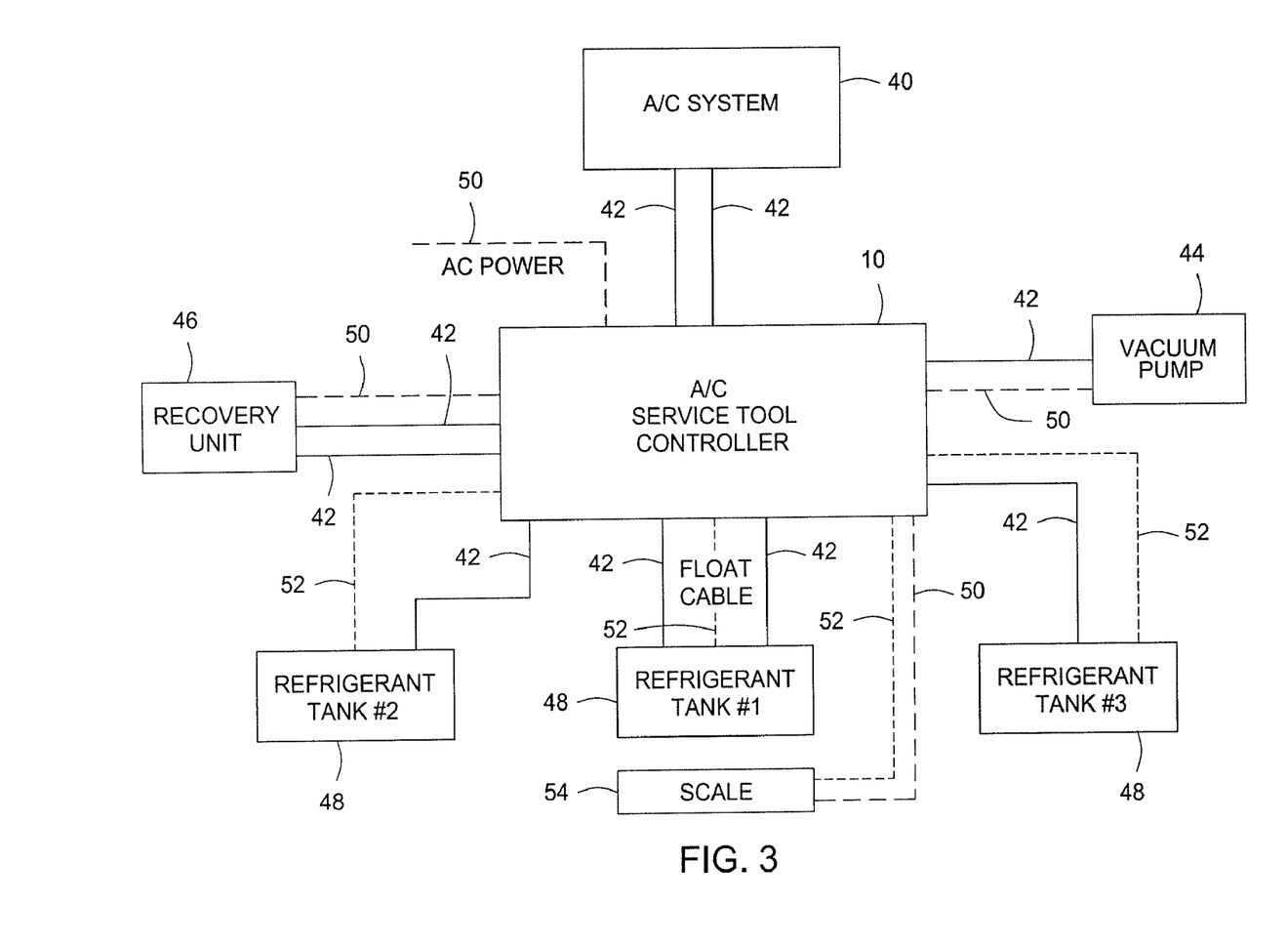
FIG. 3 is a block diagram an A/C service tool controller connected to an A/C system and A/C service tools according to an embodiment of the invention.

Referring now to FIG. 3, illustrated is another block diagram of the A/C service tool controller 10 connected to a selection of A/C service tools and an A/C system 40 according to one embodiment of the invention. The A/C service tool controller 10 may be similarly connected to the A/C system 40 via more than one connecting conduit 42, to the vacuum pump 44 via a connecting conduit 42 and a power cable 50, and to a power source (not shown) via a power cable 50 as in FIG. 2. However, in this embodiment, the A/C service tool controller 10 may be connected to multiple refrigerant tanks 48. Thus, the recovery unit 46 may not be connected directly to a singular refrigerant tank 48, but to multiple tanks 48. Here, the multiple refrigerant tanks 48 may each be connected to the A/C service tool controller via more than one connecting conduit 42 and a float cable 52. Similarly, the recovery unit 46 may be connected to the A/C service tool controller via more than one connecting conduit 42 and a power cable 50. This set up allows the A/C service tool controller 10 to manage larger A/C systems 40, having larger refrigerant capacity, and do so efficiently by managing how to transfer refrigerant to and from the refrigerant tanks 48.

The A/C service tool controller, in the setup depicted in FIG. 3, may use its pressure sensors and valves to manage the flow of refrigerant to and from the refrigerant tanks 48. It may be that based on the pressure readings, and also potentially on signals from the float cables 52, that the A/C service tool controller may determine that it is most efficient to fill up, or empty out, one refrigerant tank 48 completely before closing the valve(s) that controls the flow to and from that refrigerant tank 48 and opening the valve(s) that control the flow to and from another refrigerant tank 48. Alternatively, the A/C service tool controller 10 may determine it more efficient to alternate filling or emptying the refrigerant tanks 48 until the service task is completed.

The A/C service tool controller 10 may also be connected to a scale 54 via a power cable 50 and a signal cable 54 which may transfer control signals between the A/C service tool controller 10 and the scale 54. The refrigerant tanks 48 may each be placed on a scale 54 to monitor the amount of refrigerant in each refrigerant tank 48. The purpose of the scale may be to supply the A/C service tool controller 10 with information about the refrigerant tanks 48 that cannot be supplied by the float cables 52. The scale 54 may also replace the float cables 52, and thus a scale 54 may be provided for each tank 48. The A/C service tool controller 10 may use the information from the scales 54 to manage the flow of refrigerant to and from the refrigerant tanks 48.

In any of the above embodiments, it should be noted that after the initial setup by the user, once the A/C service tool controller 10 is running, it may not be necessary for the user to interact with or monitor A/C service tool controller 10, the A/C system 40, or the A/C service tools, until the service task is complete. In other words, this process may be automated. This allows the user to make other use of the time it takes for the service task to finish.

Figure 4:
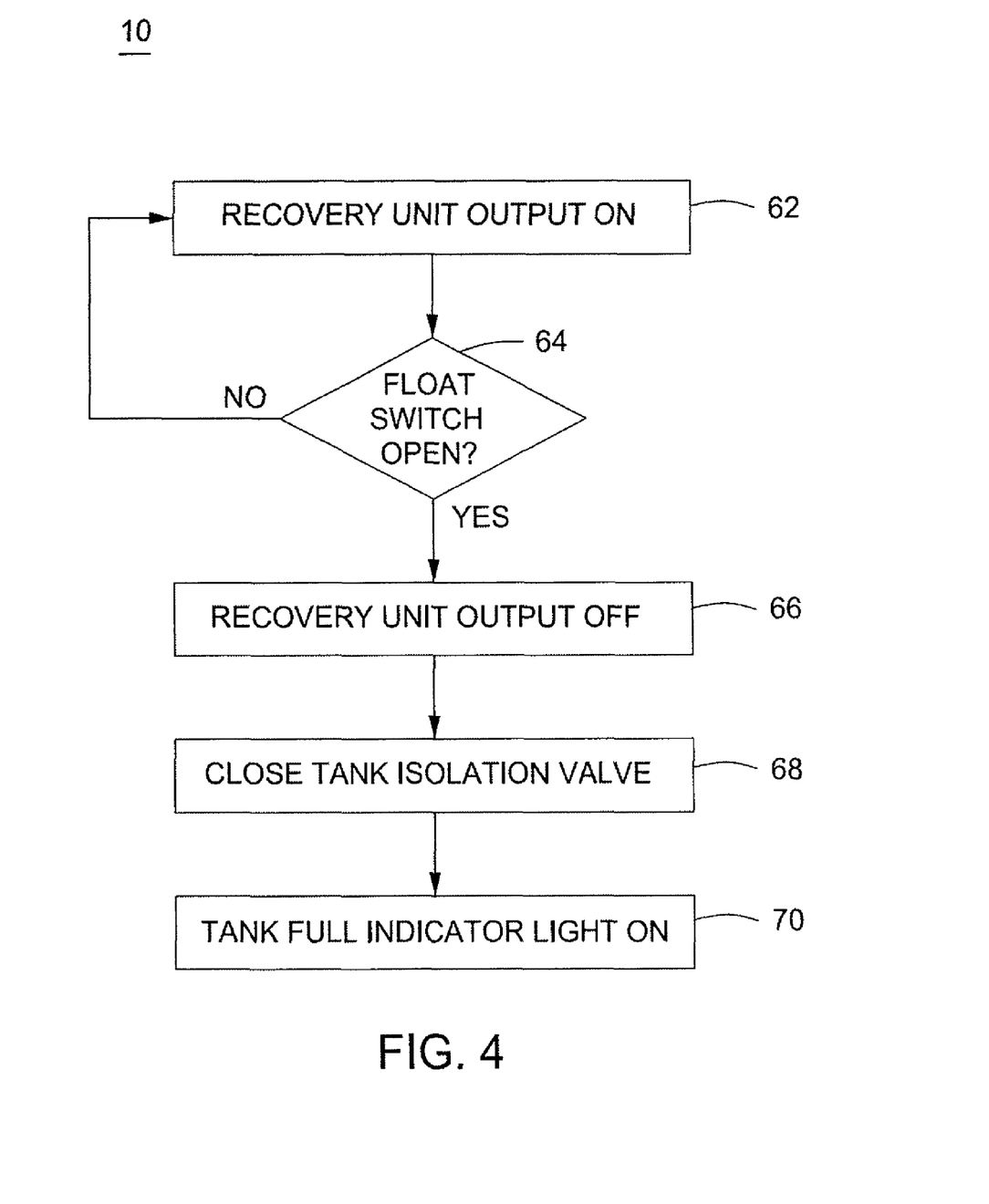
FIG. 4 is a flow diagram of a method for tank full automatic shutoff using an A/C service tool controller according to an embodiment of the invention.

Referring now to FIG. 4, illustrated is a flow diagram of a method for tank full automatic shutoff 60 using an A/C service tool controller 10 according to an embodiment of the invention. First, the A/C service tool controller 10 may power on the recovery unit 46 (step 62). The A/C service tool controller 10 may then check if a full signal had been sent from the refrigerant tank 48 over the float cable 52 (step 64). If no, the A/C service tool controller 10 returns to step 62 and allows the recovery unit 46 to continue to run. If the signal has been sent, then the A/C service tool controller 10 powers off the recovery unit 46 (step 66), closes the valve leading to the refrigerant tank 48 (step 68), and displays on the display 28, or through other indicators, an indication that the refrigerant tank 48 is full (step 70).

Figure 5:
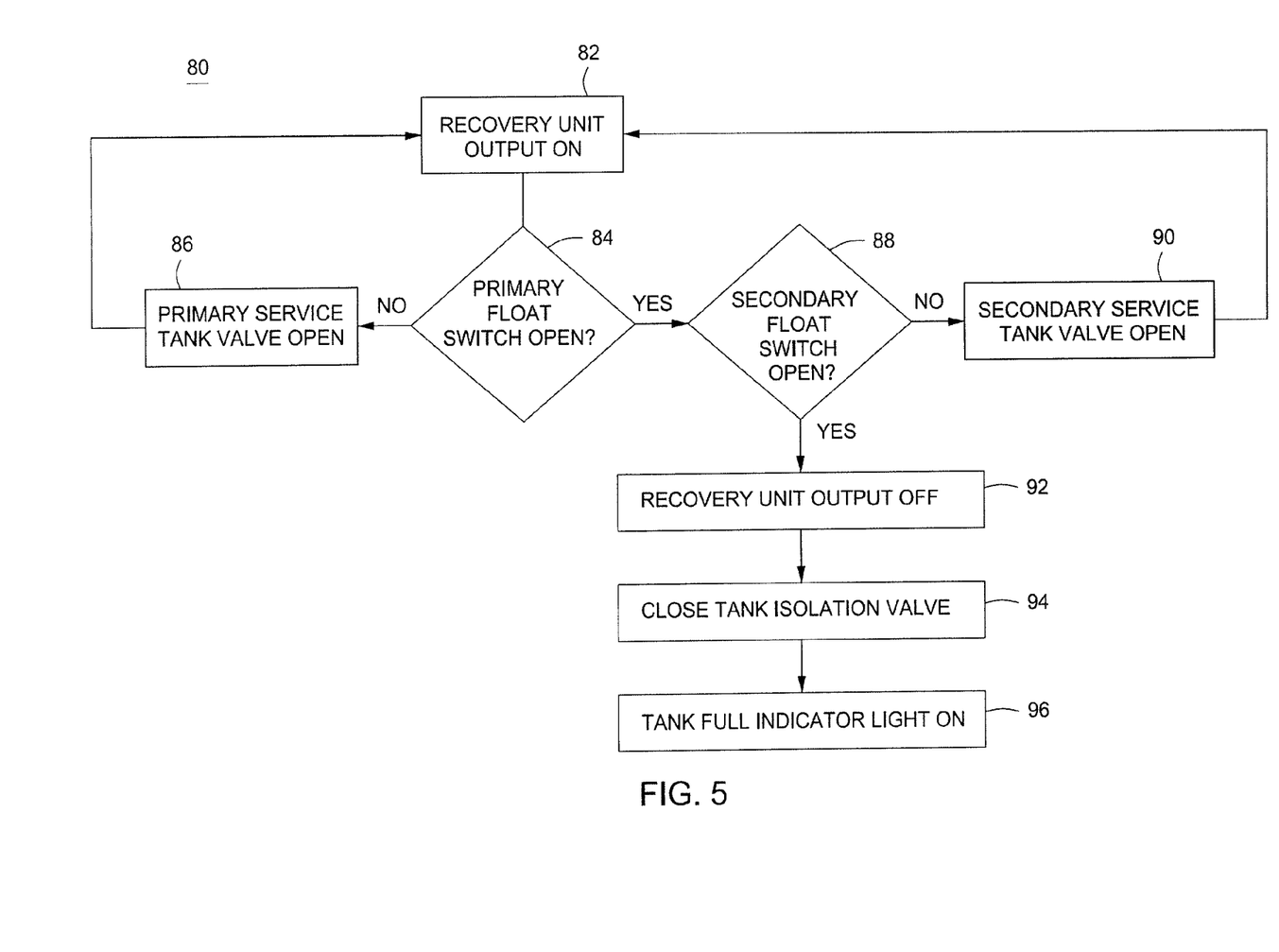
FIG. 5 is a flow diagram of a method for refrigerant recovery using multiple tanks with an A/C service tool controller according to an embodiment of the invention.

FIG. 5 is a flow diagram of a method for refrigerant recovery using multiple tanks with the A/C service tool controller 10 according to an embodiment of the invention. First, the A/C service tool controller 10 may power on the recovery unit 46 (step 82). The A/C service tool controller 10 may then check if a full signal had been sent from the first refrigerant tank 48 over its respective float cable 52 (step 84). If the full signal has not been sent, then the A/C service tool controller 10 may open the valve controlling the flow of refrigerant to the first refrigerant tank 48 (step 86) and then return to step 82 and allows the recovery unit 46 to continue to run. If the full signal has been sent, then the A/C service tool controller 10 may then check if a full signal had been sent from the second refrigerant tank 48 over its respective float cable 52 (step 88). If the full signal has not been sent, then the A/C service tool controller 10 may open the valve controlling the flow of refrigerant to the second refrigerant tank 48 (step 90) and then return to step 82 and allows the recovery unit 46 to continue to run. If the full signal has been sent from all of the refrigerant tanks 48 connected to the A/C service tool controller 10, then it may power off the recovery unit 46 (step 92), close any valves leading to the refrigerant tanks 48 (step 94), and display on the display 28, or other indicators, an indication that which of, or all of, the refrigerant tanks 48 are full (step 96).

During a service task involving the use of multiple refrigerant tanks 48, tank full indicators may be displayed for each refrigerant tank 48 as it reaches capacity, or as the final refrigerant tank 48 reaches capacity. Also, When a refrigerant tank 48 becomes full, the A/C service tool controller 10 may close any valves that control the flow of refrigerant to the full refrigerant tank 48 while not impeding the flow to any other connected refrigerant tank 48.

Figure 6:
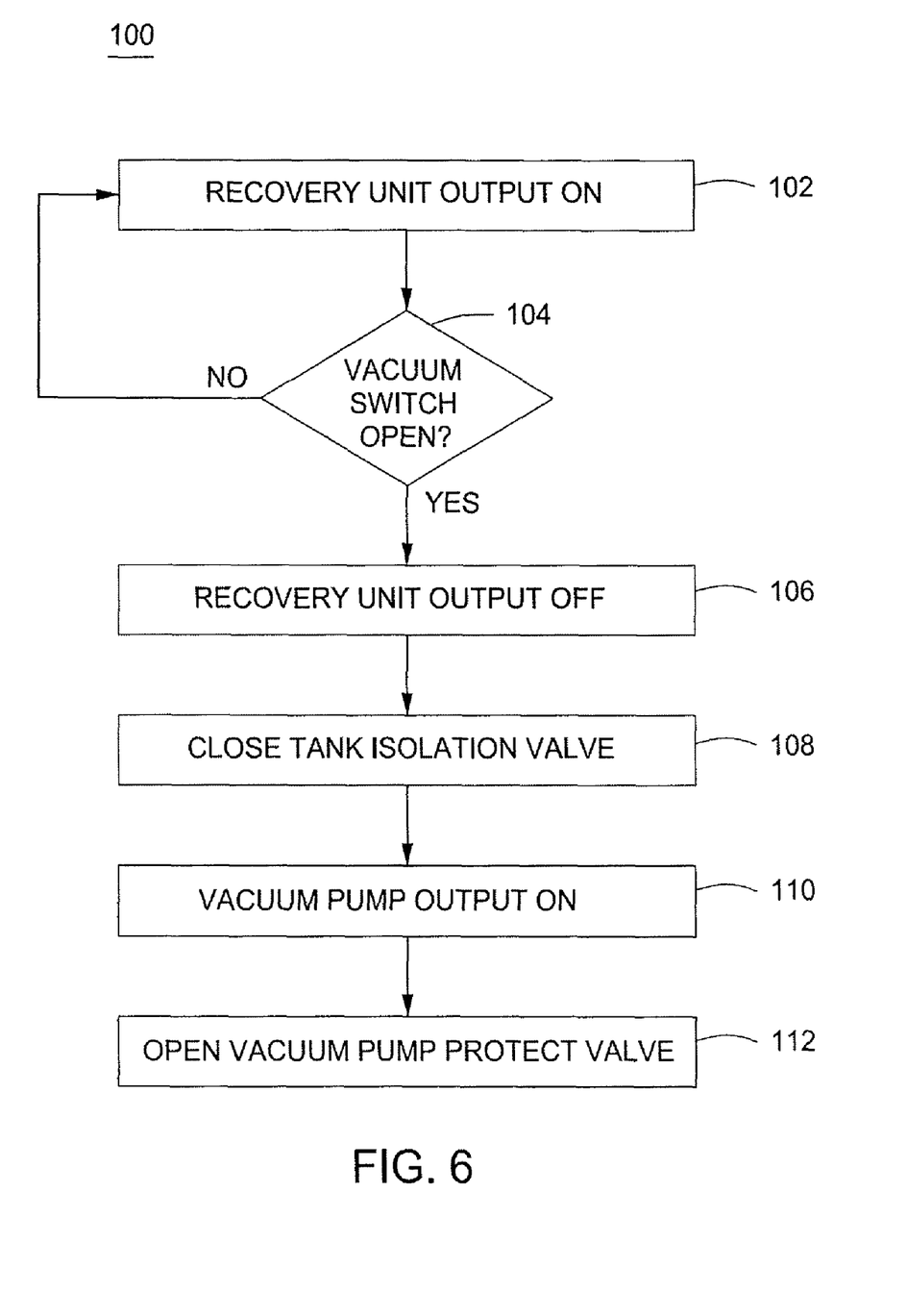
FIG. 6 is a flow diagram of a method for automatic vacuum using an A/C service tool controller according to an embodiment of the invention.

FIG. 6 is a flow diagram of a method for automatic vacuum using the A/C service tool controller 100 according to an embodiment of the invention. First, the A/C service tool controller 10 may power on the recovery unit 46 (step 102). The A/C service tool controller 10 may then check if the valve controlling the flow between the vacuum pump 44 and the A/C service tool controller 10 is open (step 104). If the valve is not open, then the A/C service tool controller 10 return to step 102 and allows the recovery unit 46 to continue to run. If the valve is open, then the A/C service tool controller 10 may power off the recovery unit 46 (step 106) and close any valves controlling the flow of refrigerant to the refrigerant tank 48 (step 108). Following that, the A/C service tool controller 10 may power on the vacuum pump (step 110) and open the valve controlling the flow between the vacuum pump 44 and the A/C service tool controller 10 (step 112).

Figure 7:
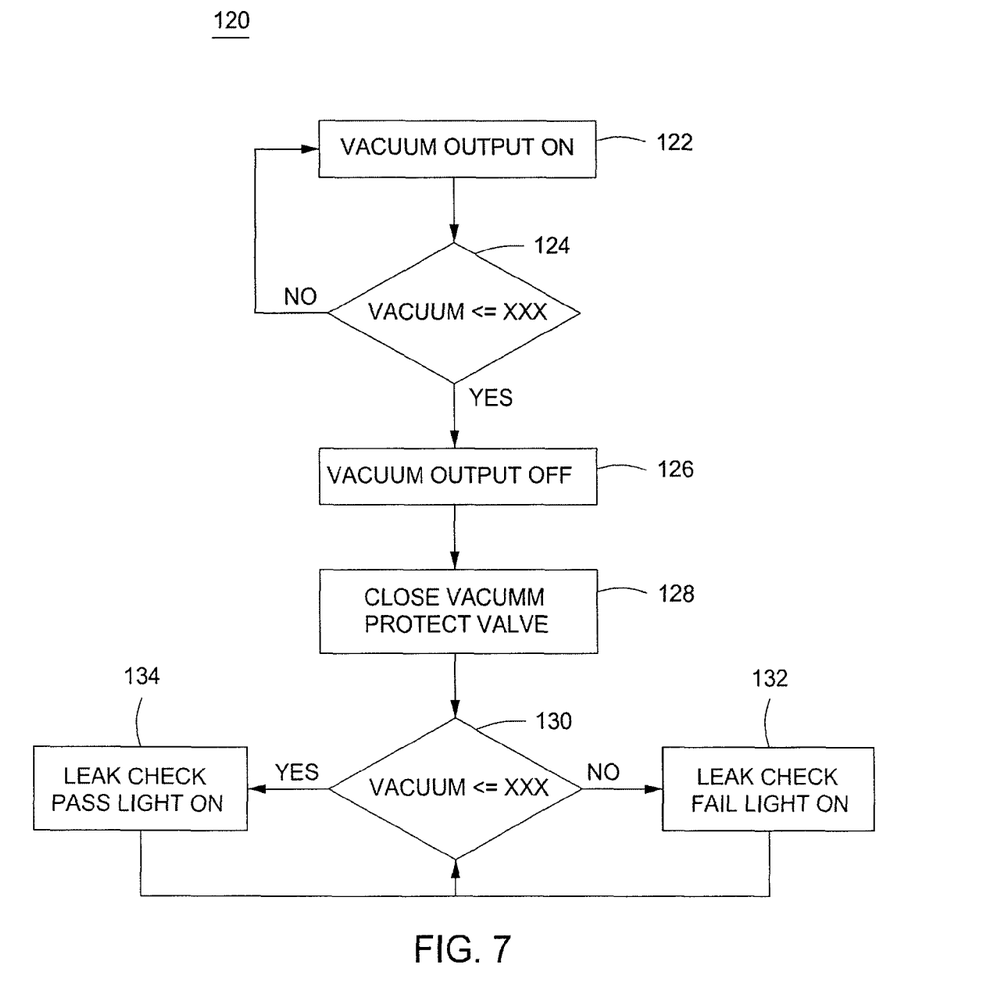
FIG. 7 is a flow diagram of a method for leak check using an A/C service tool controller according to an embodiment of the invention.

FIG. 7 is a flow diagram of a method for leak check using the A/C service tool controller 120 according to an embodiment of the invention. First, the A/C service tool controller 10 may power on the vacuum pump 44 (step 122). The A/C service tool controller 10 may then check if the vacuum pressure within the connecting conduit 42 is less than or equal to a preset value (step 124). If the condition is not met, then the A/C service tool controller 10 return to step 122 and allows the vacuum pump 46 to continue to run. If the condition is met, then the A/C service tool controller 10 may power off the vacuum pump (step 126) and close any valves controlling the flow between the vacuum pump 44 and the A/C service tool controller 10 (step 128). Following that, the A/C service tool controller 10 may again check if the vacuum pressure within the connecting conduit 42 is less than or equal to a preset value (step 130). If the condition is not met, then the A/C service tool controller 10 may indicate on the display 28, or other indicators, that a leak exists (step 132). If the condition is met, then the A/C service tool controller 10 may indicate on the display 28, or other indicators, that no leak exists (step 134).

Figure 8:
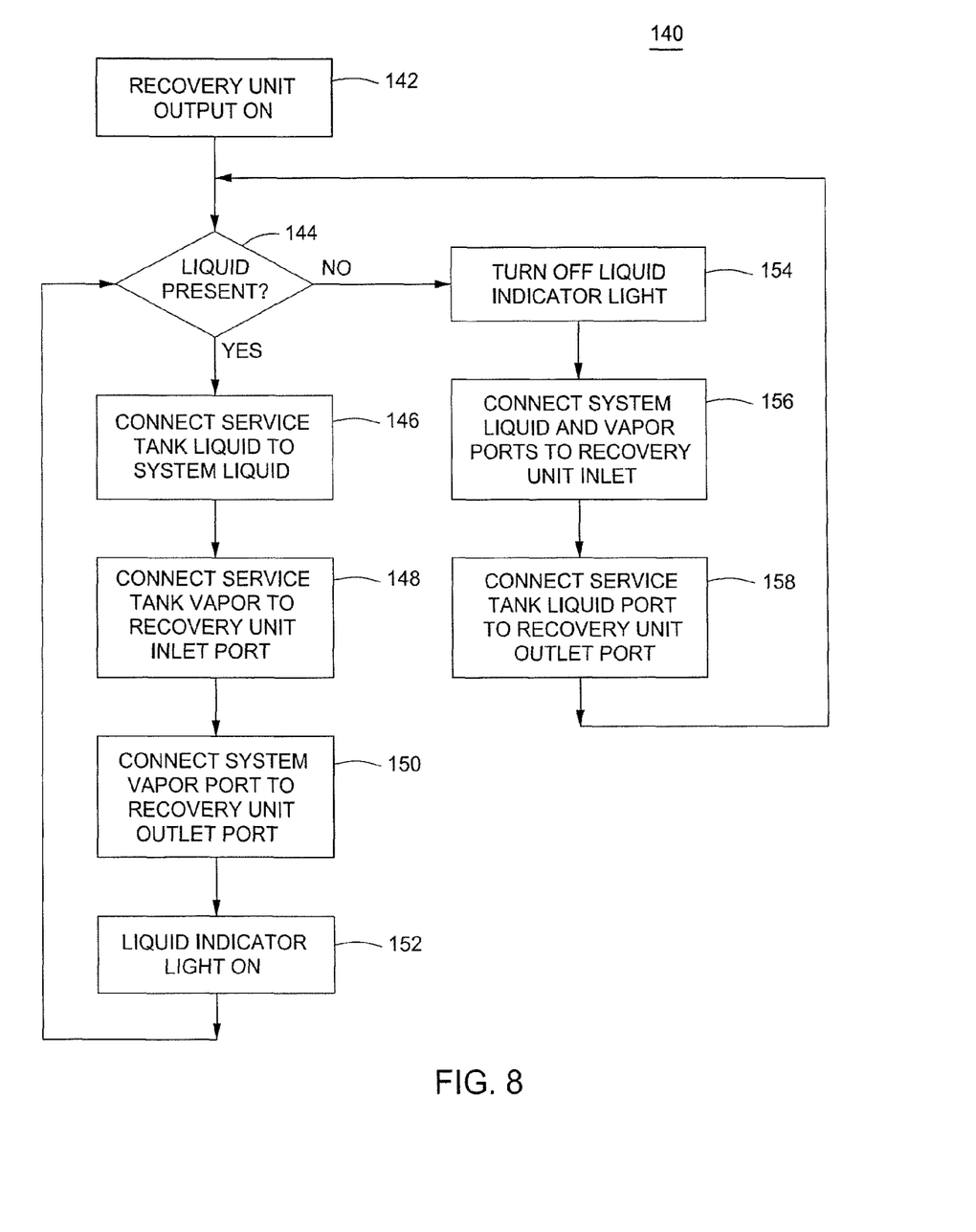
FIG. 8 is a flow diagram of a method for automatic liquid lift using an A/C service tool controller according to an embodiment of the invention.

FIG. 8 is a flow diagram of a method for automatic liquid lift using the A/C service tool controller 140 according to an embodiment of the invention. First, the A/C service tool controller 10 may power on the recovery unit 46 (step 142). The A/C service tool controller 10 may then check if there is refrigerant liquid in the A/C system 40 (step 144). If there is refrigerant liquid, then The A/C service tool controller 10 may connect, by opening and closing the appropriate valves, a refrigerant liquid port of the refrigerant tank 48 to a refrigerant liquid port of A/C system 40 (step 146). The A/C service tool controller 10 may also connect a vapor port of the recover tank 48 to an inlet port of the recovery unit 46 (step 148) and a vapor port of the A/C system 40 to an outlet port of the recovery unit 46 (step 150). The A/C service tool controller 10 may also indicate on the display 28, or other indicators, that there is liquid in the A/C system 40 (step 152). The A/C service tool controller 10 may continue to check for the presence of liquid by returning to step 144.

If no liquid is detected (step 144), then the A/C service tool controller 10 may cease to indicate on the display 28, or other indicators, that there is liquid in the A/C system 40 (step 154). Then the A/C service tool controller 10 may connect the liquid and vapor ports of the A/C system 40 to the inlet port of the recovery unit 46 (step 156) and connect the outlet port of the recovery unit 46 to the liquid port of the refrigerant tank 48 (step 158).

Figure 9:
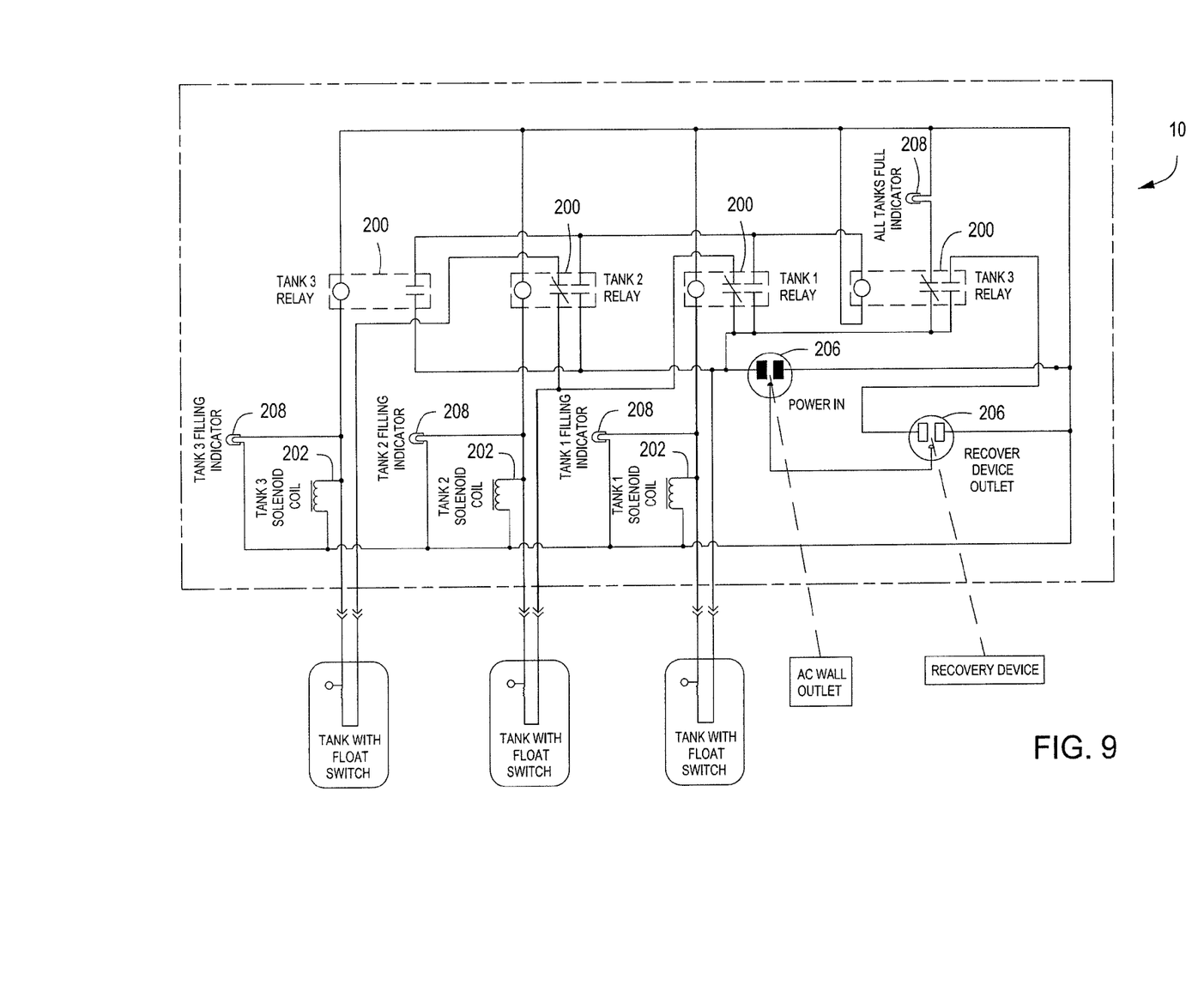
FIG. 9 is a schematic diagram of an A/C service tool controller connected to A/C service tools according to an embodiment of the invention.
Figure 10:
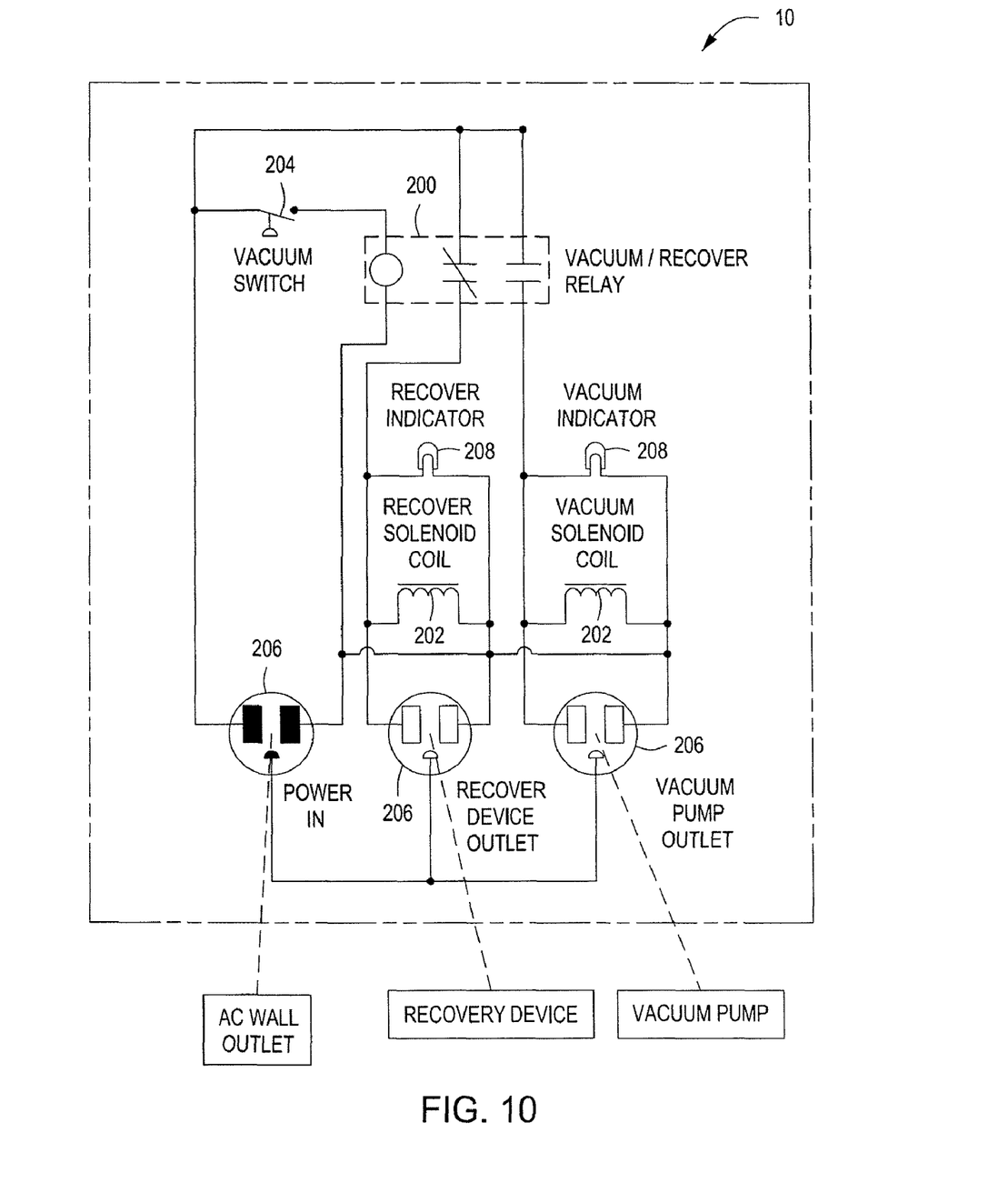
FIG. 10 is a block diagram of an A/C service tool controller connected to A/C service tools according to an embodiment of the invention.

Further embodiments of the A/C service tool controller 10 are envisioned to be a combination of the above described components with electromechanical components, or even comprised of solely electromechanical components. The A/C service tool controller 10 may include one or more of, or none of, the processor 20, the memory 22, the connector 24, the input device 26, the display 28, and the datalink 30 in combination with electromechanical components. FIGS. 9 and 10 illustrate possible configurations of electromechanical components of the A/C service tool controller 10 according to embodiments of the invention.

Referring now to FIGS. 9 and 10, the A/C service tool controller 10 may include a combination of electromechanical components such as, but not limited to, a relay 200, a solenoid 202, a switch 204, an electrical socket 206, and/or an indicator 208. The relay 200 could be any one or combination of, for example, a latching relay, a reed relay, a mercury-wetted relay, a polarized relay, a machine tool relay, a contactor relay, a solid-state relay, a solid-state contactor relay, a buchholz relay, a forced-guide contacts relay, and/or an overload protection relay. The switch 204 may have any one or combination of contact arrangements, for example: a single pole, single throw; a single pole, double throw; a single pole changeover; a double pole, single throw; a double pole, double throw; and/or a double pole changeover. The switch 204 may be, for example, a biased switch, a trembler switch, a float switch, a key switch, a limit switch, a reed switch, a mercury tilt switch, and/or a knife switch. The electrical socket 206 may be any one or combination of proprietary and/or common electrical socket available in any country. The indicator 208 may be any one or combination of, for example, visual, audible, tactile, and/or any other sensory stimulant, such as an LED or a speaker. Other electromechanical components that may be incorporated into the A/C service tool controller 10, but are not shown, may include, for example, a fuse, a ground, a sensor, a motor, and an actuator.

FIGS. 1-10 are diagrams and flowcharts of methods and systems according to various embodiments of the present invention. It will be understood that the steps of the flowchart illustration, and combinations of steps in the flowchart illustration, can be implemented by computer program instructions or other means. Although computer program instructions are discussed, an apparatus according to the present invention can include other means, such as hardware or some combination of hardware and software, including one or more processors or controllers, for performing the disclosed functions.

Typically, computer program instructions, such as portions of the instructions for reimaging a computing device, may be loaded onto the computer or other general purpose programmable machine, such as the A/C service tool controller 10, to produce a specialized machine, such that the instructions that execute on the computer or other programmable machine create means for implementing the functions specified in the flowchart. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the flowchart.

In addition, the computer program instructions may be loaded into a computing device or other programmable machine, such as the A/C service tool controller 10, to cause a series of operational steps to be performed by the computing device or other programmable machine to produce a computer-implemented process, such that the instructions that execute on the computer or other programmable machine provide steps for implementing the functions specified in the flowchart steps.

Accordingly, steps of the flowchart support combinations of means for performing the specified functions, combinations of steps for performing the specified functions and program instruction means for performing the specified functions. It will also be understood that each step of the flowchart, as well as combinations of steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An A/C service tool controller for connecting to an A/C system and A/C service tools via connecting conduits and controlling A/C service tasks involving the A/C system and the A/C service tools, comprising:
   a memory configured to store instructions for running the A/C service tool controller;
   a processor communicatively connected to the memory and configured to access and execute the instructions;
   a manifold having a plurality of connectors configured to attach to the connecting conduits leading to the A/C system and the A/C service tools;
   a valve configured to control a flow of substances though the manifold;
   a pressure sensor communicatively connected to the processor and configured to sense a pressure within the manifold;
   a power port communicatively connected to the processor and configured to accept a power plug of the A/C service tools; and
   a display communicatively connected to the processor configured to display information.

2. The A/C service tool controller of claim 1, wherein the pressure sensor is a pressure switch.

3. The A/C service tool controller of claim 1, wherein the valve is an electronically controlled solenoid valve communicatively connected to the processor.

4. The A/C service tool controller of claim 1, wherein the display is a digital display.

5. The A/C service tool controller of claim 1, wherein the display is further configured to display state indicators of the A/C service tools.

6. The A/C service tool controller of claim 1 further comprising:
   a connector configured to accept a float cable connector of a refrigerant tank and receive a signal indicating that the refrigerant tank is full.

7. The A/C service tool controller of claim 1 further comprising:
   a data port configured to accept a data connector of the A/C service tools or the A/C system.

8. The A/C service tool controller of claim 1, wherein the processor is configured to receive signals from the pressure sensor, control an output of the power port, and control a state of the valve.

9. The A/C service tool controller of claim 1, further comprising:
   an input device communicatively connected to the processor and configured to manipulate settings of the A/C service tool controller.

10. The A/C service tool controller of claim 9, wherein the display is further configured to display a menu driven user interface configured to be controlled via interaction with the input device to manipulate the settings of the A/C service tool controller.

11. A method of automatically controlling A/C service tasks involving A/C service tools and an A/C system via an A/C service tool controller, comprising the steps of:
sensing a pressure in the A/C service tool controller;
controlling power to a power port of the A/C service tool controller based at least in part on the sensed pressure; for powering the A/C service tools;
adjusting valves in the A/C service tool controller; based at least in part on the sensed pressure and
displaying pressure sensing readings on a display.

12. The method of automatically controlling A/C service tasks of claim 11 further comprising the step:
receiving a signal from the A/C service tools.

13. The method of automatically controlling A/C service tasks of claim 12, wherein the step of adjusting the valves in the A/C service tool controller further comprises adjusting the valves according to the signal received from the A/C service tools.

14. The method of automatically controlling A/C service tasks of claim 12, wherein the step of controlling power to the power port of the A/C service tool controller further comprises controlling the power according to the signal received from the A/C service tools.

15. The method of automatically controlling A/C service tasks of claim 11 further comprising the step:
receiving a signal from the A/C system.

16. The method of automatically controlling A/C service tasks of claim 15, wherein the step of adjusting the valves in the A/C service tool controller further comprises adjusting the valves according to the signal received from the A/C system.

17. The method of automatically controlling A/C service tasks of claim 15, wherein the step of controlling power to the power port of the A/C service tool controller further comprises controlling the power according to the signal received from the A/C system.

18. The method of automatically controlling A/C service tasks of claim 11 further comprising the step:
displaying indications of a state of the A/C service tools on the display.

19. A system for connecting to an A/C system and A/C service tools via connecting conduits and controlling A/C service tasks involving the A/C system and the A/C service tools, comprising:
means for storing instructions for running the system;
means for processing the instructions, and communicatively connected to the means for storing;
means transmitting configured to attach to the connecting conduits leading to the A/C system and the A/C service tools;
means for controlling configured to control a flow of substances though the means for transmitting;
means for sensing communicatively connected to the means for processing and configured to sense a pressure within the means for transmitting;
means for powering configured to accept a power plug of the A/C service tool and communicatively connected to the means for processing; and
means for displaying pressure readings and communicatively connected to the means for processing.

20. An A/C service tool controller for connecting to an A/C system and A/C service tools via connecting conduits and controlling A/C service tasks involving the A/C system and the A/C service tools, comprising:
an electrical socket configured to provide power to the A/C service tools;
a relay configured to control a current to the electrical socket;
a manifold having a plurality of connectors configured to attach to the connecting conduits leading to the A/C system and the A/C service tools;
a solenoid configured to control a flow of substances though the manifold;
a sensor configured to sense a pressure within the manifold; and
a display configured to indicated readings from the sensor.

21. The A/C service tool controller of claim 20, further comprising:
an indicator configured to signify a state of operation of the A/C service tool controller wherein the relay is further configured to receive a signal from the A/C service tools, and to control a current to the solenoid and the indicator.

* * * * *